Oct. 30, 1934.                H. BARTON                1,978,779
                          BATTERY CONSTRUCTION
                          Filed June 27, 1933        4 Sheets-Sheet 1

Inventor
Henry Barton
By Clarence A. O'Brien
Attorney

Oct. 30, 1934.                    H. BARTON                      1,978,779
                              BATTERY CONSTRUCTION
                           Filed June 27, 1933        4 Sheets-Sheet 2

Inventor
Henry Barton
By Clarence A. O'Brien
Attorney

Oct. 30, 1934.  H. BARTON  1,978,779
BATTERY CONSTRUCTION
Filed June 27, 1933   4 Sheets-Sheet 4

Inventor
Henry Barton
By Clarence A. O'Brien
Attorney

Patented Oct. 30, 1934

1,978,779

UNITED STATES PATENT OFFICE 1,978,779

BATTERY CONSTRUCTION

Henry Barton, Atmore, Ala.

Application June 27, 1933, Serial No. 677,903

3 Claims. (Cl. 136—166)

This invention appertains to new and useful improvements in storage battery constructions, and more particularly to a storage battery of the secondary type having a plurality of cells.

The principal object of the present invention is to provide a secondary battery having removable cells in units to facilitate repair of the secondary battery conveniently and at low cost.

Other important objects and advantages of the invention will become apparent to the reader of the following specification.

In the drawings:—

Figure 1:
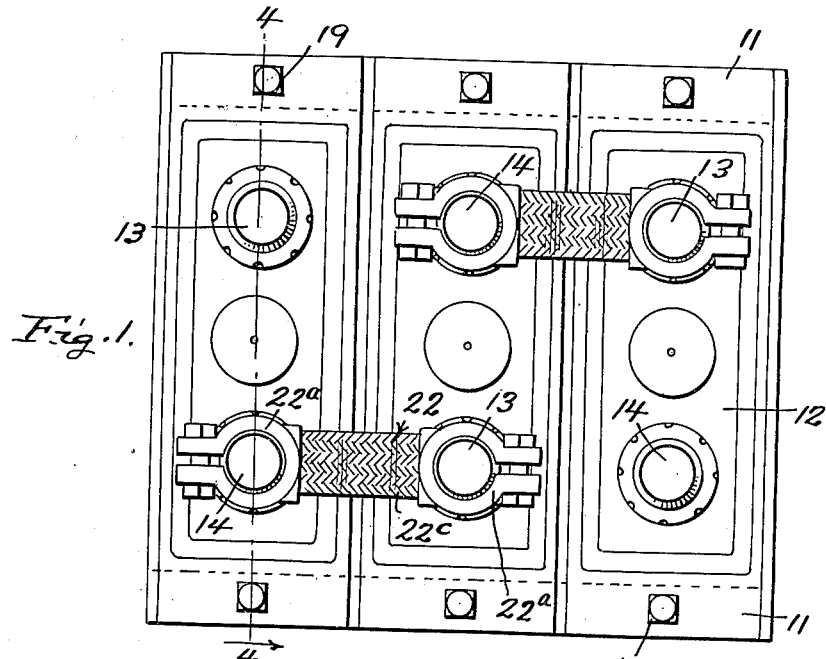
Figure 1 represents a top plan view of the improved battery.
Figure 2:
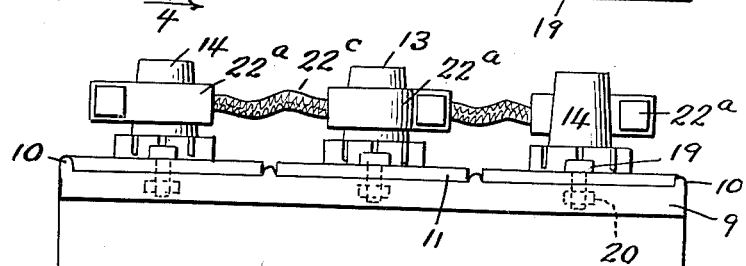
Figure 2 represents a side elevational view of the battery.
Figure 3:
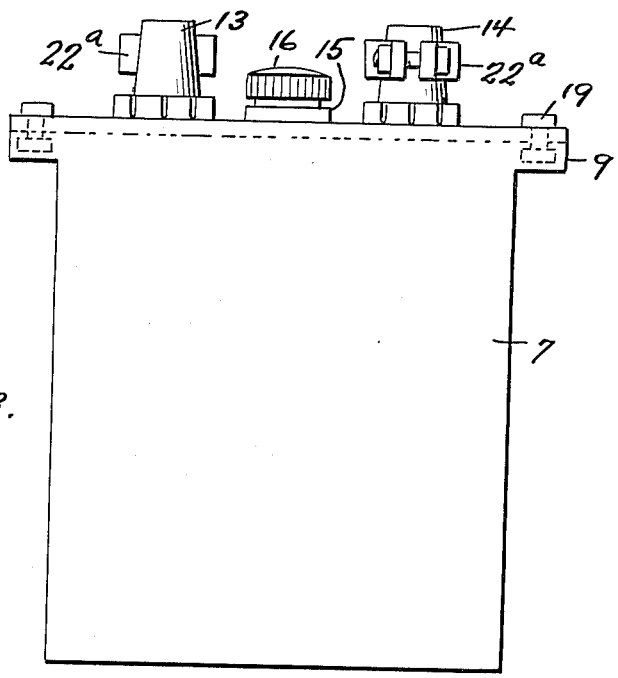
Figure 3 represents an end elevational view of the battery.
Figure 4:
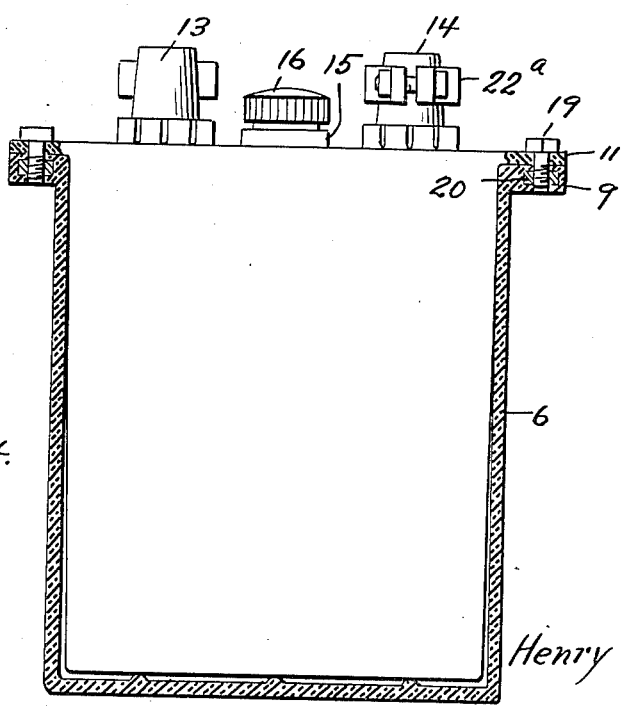
Figure 4 represents a cross sectional view taken substantially on line 4—4 of Figure 1.
Figure 5:
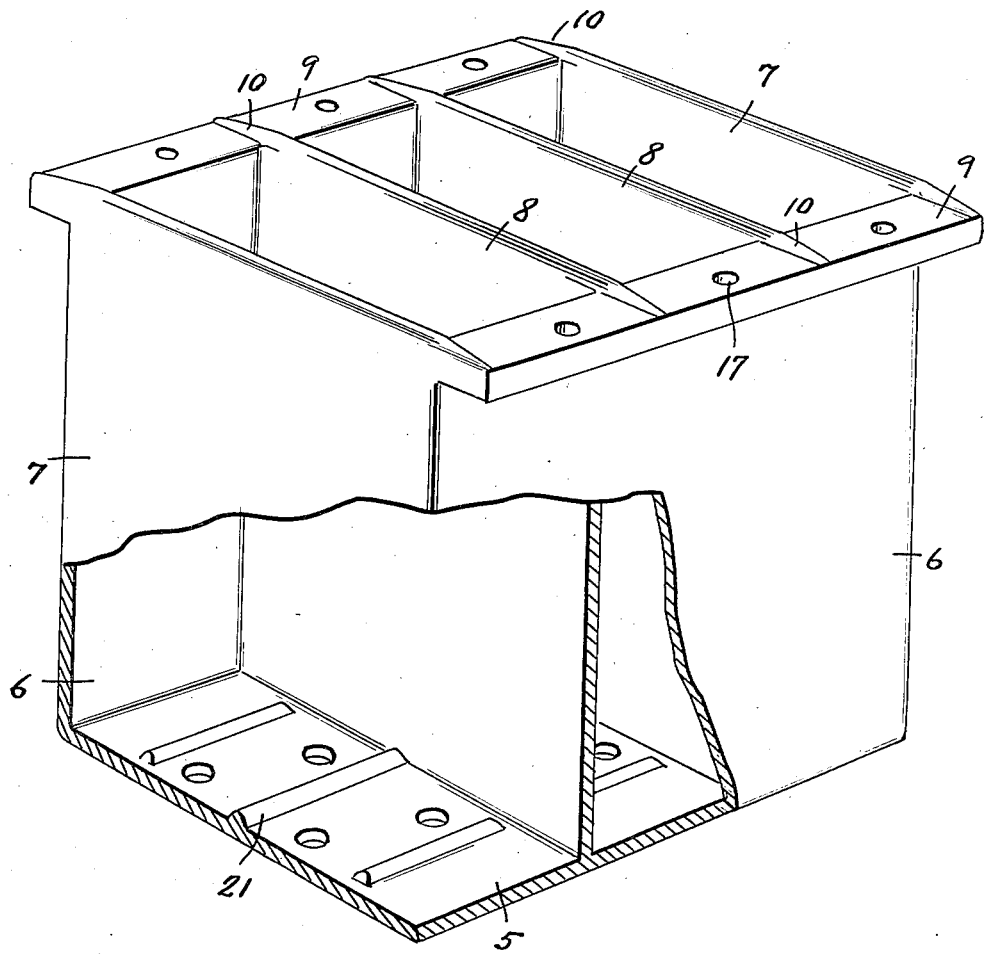
Figure 5 represents a perspective view of the battery case partly broken away to show the interior thereof.
Figure 6:
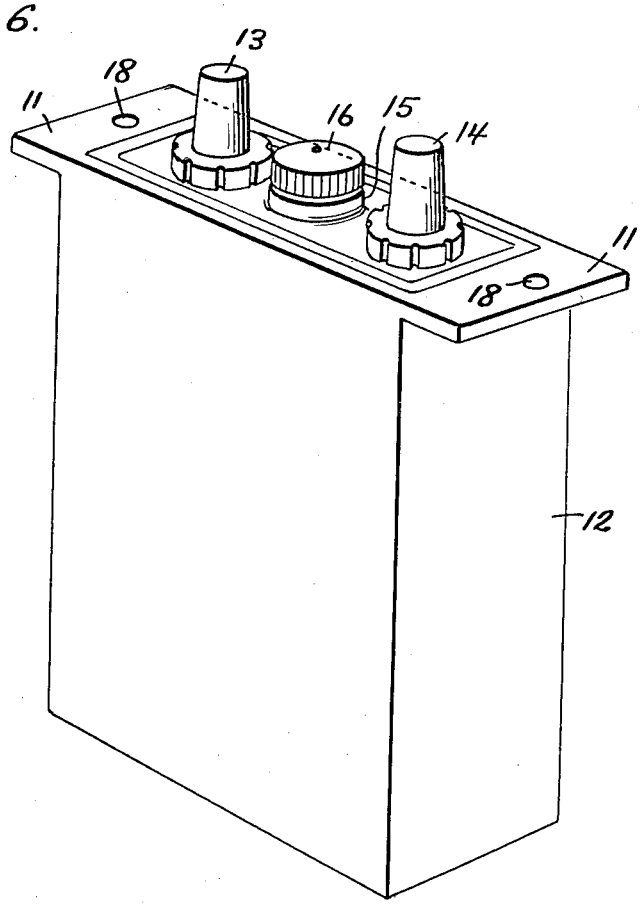
Figure 6 represents a perspective view of one of the cell units.

Referring to the drawings wherein like numerals designate like parts, it can be seen that the battery case is of rectangular shape and is preferably made of some suitable rubber compound. The case consists of the bottom wall 5, the side walls 6—6 and the end walls 7—7. The interior of the battery is divided by any suitable number of partitions 8. The side walls 6, at their upper edges are provided with outwardly disposed flanges 9 and transversely extending across these flanges 9—9 are ribs 10 which merge with the partitions 8—8 and the end walls 7—7 so as to provide guides for the flanges 11—11 at the upper portion of the individual cell units 12. Each of these units has the positive and negative plates therein, the positive plates being connected to the pole piece 13 while the negative plates are connected to the pole piece 14. Numeral 15 represents the filler neck which is normally closed by the cap 16.

The spaces on the flanges 9 between the ribs 10 have openings 17 therein to register with the openings 18 in the flanges 11 of the cell units 12 and through these registering openings bolts 19 are disposed and these bolts are equipped with nuts 20 whereby the cell units are firmly retained within the case.

Figure 7:
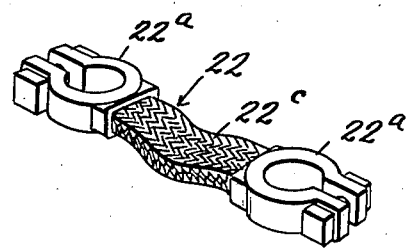
Figure 7 represents a perspective view of one of the connectors.

The bottom 5 of the case is provided with upstanding ribs 21 for supporting the units 12 above the bottom 5. The positive and negative poles of the cell units 12 are strapped together by connectors 22, as in the manner shown in Figure 1, it being preferable that these connectors be of flexible copper braid or some other suitable flexible material or construction. As is shown in Figure 7, this connector may consist of the pair of clamps 22ª—22ª connected by the flexible strap 22ᶜ.

It can be seen that when a cell becomes defective, all that is necessary is to remove the flange bolts thereof and lift the defective cell and replace the same with a cell in good working order and subsequently attach the connector 22. This can be done within a short period of time, thus reducing the cost of repairing secondary batteries considerably.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

1. A secondary battery comprising a case having lateral flanges at its upper portion, a plurality of removable cell units for disposition into the case, each of the said cell units having flanges at its upper portion for disposition over the flanges of the case and securing means between the flanges of the units and the flanges of the case.

2. A secondary battery comprising a case having lateral flanges at its upper portion, a plurality of removable cell units for disposition into the case, each of the said cell units having flanges at its upper portion for disposition over the flanges of the case and securing means between the flanges of the units and the flanges of the case, said case being provided with internal partitions dividing the interior of the case into compartments to receive the units.

3. A secondary battery comprising a case having lateral flanges at its upper portion, a plurality of removable cell units for disposition into the case, each of the said cell units having flanges at its upper portion for disposition over the flanges of the case and securing means between the flanges of the units and the flanges of the case, said case being provided with internal partitions dividing the interior of the case into compartments to receive the units and ribs transversely disposed across the flanges of the case and merging with the end walls and partitions of the said case.

HENRY BARTON.